(12) United States Patent
Peng et al.

(10) Patent No.: US 10,726,168 B2
(45) Date of Patent: Jul. 28, 2020

(54) INTEGRATION METHOD FOR ACCURATE MODELING AND ANALYSIS AND RELIABILITY-BASED DESIGN OPTIMIZATION OF VARIABLE STIFFNESS COMPOSITE PLATE AND SHELL STRUCTURES

(71) Applicant: Dalian University of Technology, Dalian, Liaoning Province (CN)

(72) Inventors: Hao Peng, Dalian (CN); Wang Yutian, Dalian (CN); Liu Chen, Dalian (CN); Yuan Xiaojie, Dalian (JP); Wang Bo, Dalian (CN); Liu Hongliang, Dalian (CN); Yang Dixiong, Dalian (CN); Li Gang, Dalian (CN); Wang Bin, Dalian (CN); Jiang Liangliang, Dalian (CN)

(73) Assignee: DALIAN UNIVERSITY OF TECHNOLOGY, Dalian Liaoning (CN)

( * ) Notice: Subject to any disclaimer, the term of this patent is extended or adjusted under 35 U.S.C. 154(b) by 399 days.

(21) Appl. No.: 15/850,909

(22) Filed: Dec. 21, 2017

(65) Prior Publication Data

US 2019/0080040 A1 Mar. 14, 2019

(30) Foreign Application Priority Data

Sep. 13, 2017 (CN) .......................... 2017 1 0817532

(51) Int. Cl.
*B29C 70/30* (2006.01)
*G06F 30/17* (2020.01)
(Continued)

(52) U.S. Cl.
CPC .............. *G06F 30/17* (2020.01); *B29C 70/30* (2013.01); *G06F 30/20* (2020.01); *G06F 2111/04* (2020.01); *G06F 2113/26* (2020.01)

(58) Field of Classification Search
CPC ......... G06F 30/23; G06F 30/00; B64C 1/061; E02F 3/40; B29C 70/06; B65D 90/12; F03D 80/88
See application file for complete search history.

(56) References Cited

U.S. PATENT DOCUMENTS 10,183,449 B2 * 1/2019 Rassaian ................. B29C 70/30
2010/0007149 A1 * 1/2010 Willey .................... F03D 80/88
290/55

(Continued)

*Primary Examiner* — Kandasamy Thangavelu
(74) *Attorney, Agent, or Firm* — Muncy, Geissler, Olds & Lowe, P.C.

(57) ABSTRACT

The present invention relates to the field of reliability-based structural design optimization, and provides an integration method for accurate modeling and analysis and reliability-based design optimization of variable stiffness composite plate and shell structures. In this method, the first-order reliability method, two-point adaptive nonlinear approximation and second-order reliability method are applied into the efficient reliability-based design optimization of variable stiffness composite plate and shell structures. The fiber placement path of variable stiffness composite plate and shell structures is accurately modeled by non-uniform rational B-spline function. Isogeometric analysis is utilized for the variable stiffness composite plate and shell structures, including conducting linear buckling analysis on the variable stiffness composite plate and shell structures based on the isogeometric analysis method and deriving analytical sensitivity of design and random variables on the structural response. This invention not only provides seamless integration of accurate modeling, analysis and reliability-based design optimization of variable stiffness composite plate and shell structures, but also significantly improves efficiency and accuracy of reliability-based design optimization and greatly shortens the development cycle.

4 Claims, 3 Drawing Sheets

(51) Int. Cl.
    *G06F 30/20*     (2020.01)
    *G06F 111/04*     (2020.01)
    *G06F 113/26*     (2020.01)

(56) References Cited

U.S. PATENT DOCUMENTS

| | | | |
|---|---|---|---|
| 2010/0200697 A1* | 8/2010 | Sankrithi | B64C 1/061 244/119 |
| 2012/0323538 A1* | 12/2012 | Rassaian | G06F 30/00 703/2 |
| 2015/0170022 A1* | 6/2015 | Malik | G06F 30/23 706/21 |
| 2018/0327180 A1* | 11/2018 | He | B65D 90/12 |
| 2019/0105852 A1* | 4/2019 | Hoyle | B29C 70/06 |

* cited by examiner

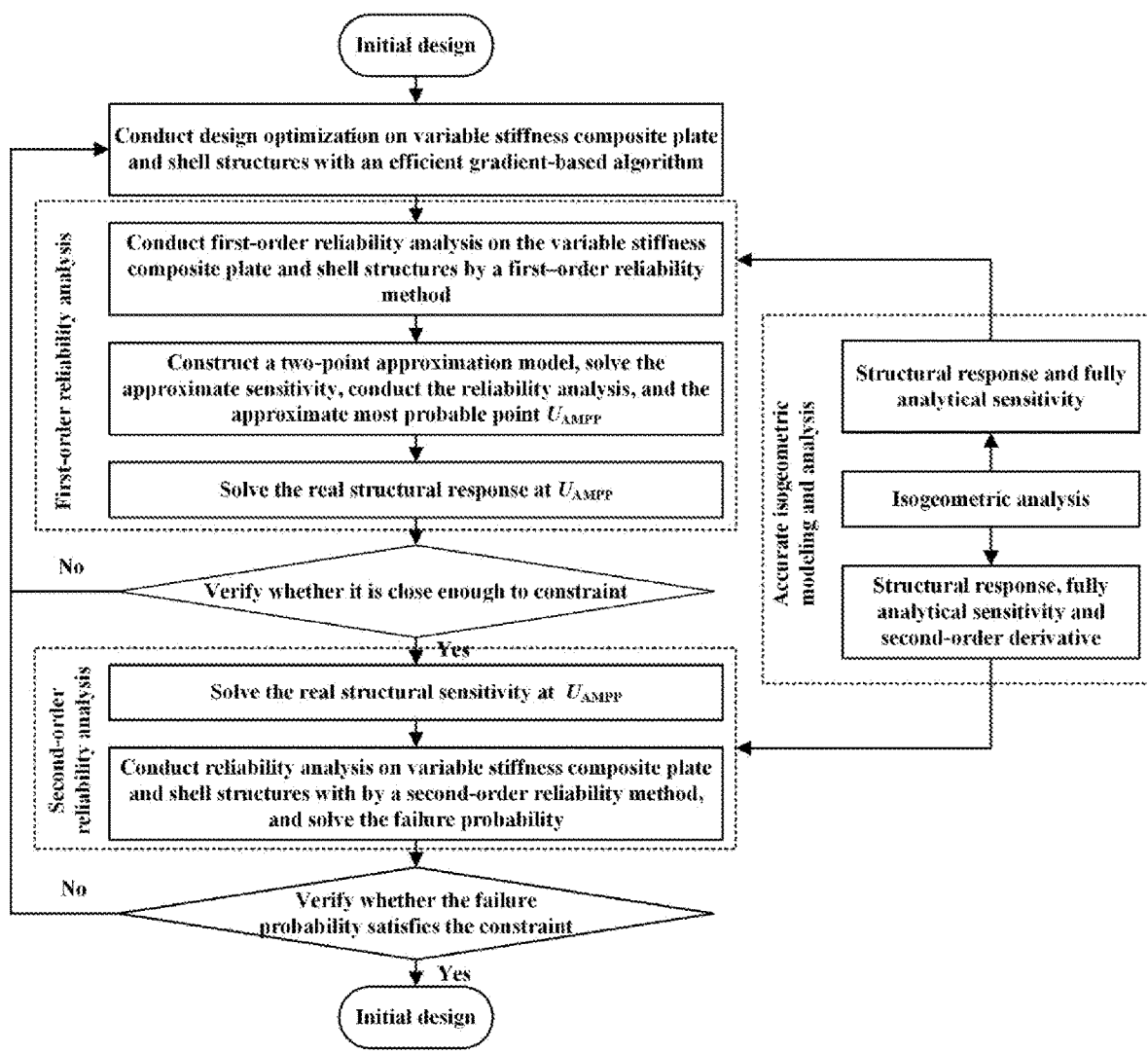
FIG. 1(As a Figure of Abstract)
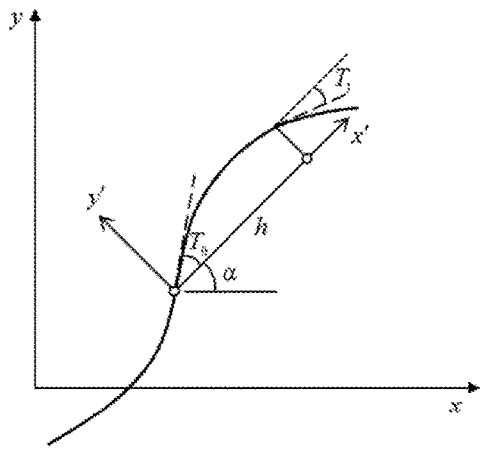
FIG. 2

INTEGRATION METHOD FOR ACCURATE MODELING AND ANALYSIS AND RELIABILITY-BASED DESIGN OPTIMIZATION OF VARIABLE STIFFNESS COMPOSITE PLATE AND SHELL STRUCTURES

TECHNICAL FIELD

The present invention belongs to the field of structural mechanics analysis method and reliability-based structural design optimization, and relates to an integration method for accurate modeling and analysis and reliability-based design optimization of variable stiffness composite plate and shell structures.

BACKGROUND

Since aerospace structures always pursue the optimal performance, they have become the frontier to test and improve advanced composite material technology. Raising the amount of composite material is crucial to the development of lightweight and high-performance aerospace equipment. Restricted by traditional manufacturing technology, the fiber placement path of fiber reinforced polymer laminates is always parallel straight, and orientation angles of the same layer of the fibers are fixed, such as 0°, 90° and ±45° always used in the project, which narrows the design space of fiber reinforced polymer laminates. By comparison, in variable stiffness design, the placement paths of the same layer of the fibers are continuous curve. According to requirement of structural-load-carrying capacity, the fiber path can adjust the local strength and stiffness to change the distribution of stress in a layer plane, so as to effectively improve structural integrated performance (such as buckling load and breaking strength). The variable stiffness design has been applied into the design of foreign aircraft fuselage structure and special-section wing structure. NASA believes that the structural elastic tailoring is a key technology to manufacture low-cost and lightweight subsonic aircraft in the future, that is, designers can use a high-strength and stability-constrained material to make the stiffness characteristic of load-carrying structure distributed as needed. In recent days, increasingly rigorous design requirements of large diameter, thin-walled and ultra-lightweight heavy rockets and large aircrafts in China, and the trend of multi-function fusion of load-carrying structures lead to growing cut-outs, complicated inner load path and stress distribution, and remarkably increased exposed risk of structural uncertainty. Obviously, for aaerospace spacecabinshell with complex load path, the promising variable stiffness composite plate and shell structure has great appeal.

The load capacity of fiber reinforced polymer structures is influenced by material property, manufacturing tolerance, load variation and other uncertainty factors. Moreover, since variable stiffness structures greatly extend the design space, the deviation of spatial distribution position of fiber orientation angles caused by the manufacturing process becomes a new uncertainty factor, which significantly increases the risk which is caused by structural uncertainty. Thus, it is urgent to apply reliability-based design optimization into variable stiffness composite structures. In order to improve the efficiency of optimization, isogeometric analysis has been utilized to the shape optimization design. The design model and analysis model have adopted the same geometric description in the isogeometric analysis, which can easily analyze the sensitivity directly and abandon the accuracy error caused by mesh approximation in calculating the traditional finite element sensitivity. It can be predicted that compared with the traditional finite element method, the optimization design of variable stiffness plate and shell structures based on isogeometric analysis can dramatically shorten the calculation time and satisfy the higher precision requirement.

The existing traditional reliability-based design optimization of variable stiffness composite plate and shell structures needs heavy computational cost and excessively depends on the finite element analysis. The reliability-based design optimization needs to call fine finite element analysis frequently. However, its optimization efficiency is extremely low even if the isogeometric analysis technology is employed. Beyond that, the inaccurate first-order reliability method is widely used in engineering due to the limitation of computing resource, to conduct reliability optimization. Nevertheless, for the aerospace field which demands rigorous reliability, reliability analysis with high efficiency and high accuracy is rather vital and imperative. Although plenty of researches have been carried out in this field, an efficient and accurate integration method for accurate modeling and reliability optimization of variable stiffness composite plate and shell structures has not yet been given.

SUMMARY

In view of the abovementioned problems, the invention proposes an integration method for accurate modeling and reliability-based design optimization of variable stiffness composite plate and shell structures, which solves technical problems in the prior art including inaccurate modeling and analysis and heavy computational cost, less accuracy and low optimization efficiency of the reliability optimization of variable stiffness composite plate and shell structures, to realize seamless integration of accurate modeling, analysis and reliability-based design optimization of variable stiffness composite plate and shells structures, significantly improve computational efficiency and accuracy of reliability-based design optimization and greatly shorten product design cycle.

To achieve the above objectives, the present invention has the technical solution:

An integration method for accurate modeling and reliability-based design optimization of variable stiffness composite plate and shell structures, comprising:

Step 100: optimization of variable stiffness composite plate and shell structure by an efficient gradient-based algorithm, using the following sub steps:

Step 101:

obtaining the buckling load, mass, fully analytical first-order derivative and second-order derivative of the variable stiffness composite plate and shell structures by an accurate isogeometric modeling and analysis method;

calculating the manufacturing constraint and reliability constraint at current design point; and transforming the deterministic buckling load constraint $P \geq P^t$ to the reliability constraint $p_f (P<P^t) \leq p^t_f$ based on reliability analysis method, for the variable stiffness composite plate and shell structures, where $P$ is the structural buckling load; $P^t$ is the target structural buckling load; $p_f$ is the failure probability of $P<P^t$; and $p^t_f$ is the target failure probability.

Step 102: establishing an integrated design framework for accurate modeling and analysis and reliability-based design optimization of variable stiffness composite plate and shell structures;

considering the uncertainty factors;

setting as design variable one of the three following variables such as single-layer fiber orientation angle, layer thickness and layer number or the combination of these three variables;

setting deviation of material property and deviation of fiber orientation angle as random variables;

optimizing the structural weight and/or manufacturing costs of the structure using the efficient gradient-based algorithm based on the manufacturing constraint and reliability constraint of the bucking load;

The efficient gradient-based algorithm consists of an interior point method, an active set method, a method of moving asymptotes, a Broyden-Fletcher-Goldfarb-Shanno (BFGS) algorithm and a sequential approximate programming method.

Step 200: reliability analysis of the variable stiffness composite plate and shell structures by the first-order reliability method, using the following sub steps:

Step 201:

initialize the inner iterative step number k=0 and transform the random variables in step 102 to standard normal variables in standard Gaussian space (U-space); and calculating the structural buckling load P and fully analytical sensitivity at kth iterative point $U_k$ in U-space based on the accurate isogeometric modeling and analysis method.

Step 202:

solving the next iterative point $U_{k+1}$ by the enhance chaos control (ECC) method of the first-order reliability method; and calculating the structural buckling load P and fully analytical sensitivity at iterative point $U_{k+1}$ based on the accurate isogeometric modeling and analysis method.

Step 203:

constructing two-point adaptive nonlinear approximation function by the provided structural buckling load and fully analytical sensitivity at $U_k$ and $U_{k+1}$; and solving the approximate most probable point $U_{SP}$ by ECC and determine whether it satisfies the convergence condition or not.

If satisfied, calculate the real sensitivity at $U_{AMPP}$. Otherwise, set k=k+1 and go back to step 202. Wherein:

The two-point adaptive nonlinear approximation function can be constructed by the following methods including two-point adaptive nonlinear approximation method. The convergence condition described in this step is the Euclidean norm of the different value between $U_{k+1}$ and $U_{AMPP}$, i.e., $|U_{k+1}-U_{AMPP}|\leq 0.001$.

Step 204:

calculating the constraint function value $g(U_{AMPP})$ at $U_{AMPP}$ based on the accurate isogeometric modeling and analysis method and determining whether it is close enough to the constraint or not.

If yes, go to step 203 to conduct the second-order reliability analysis. Otherwise, go back to step 101. Wherein:

The condition that is close enough to the constraint is defined as $$\Delta g = \frac{|g(U_{AMPP})|}{|B(X_{initial})|} \leq 0.001,$$

where B ($X_{initial}$) is the structural buckling load at initial design point $X_{initial}$.

Step 300: second-order reliability analysis by first-order reliability information including $U_{AMPP}$ and the constraint function value at $U_{AMPP}$ in step 204, using the following sub steps:

Step 301: solving the structural real sensitivity and second-order derivative at $U_{AMPP}$ based on the accurate isogeometric modeling and analysis method.

Step 302:

conducting reliability analysis on the variable stiffness composite plate and shell structures by the second-order reliability analysis method; and solving the failure probability $p_f$.

If $|p_f-p^t_f|\leq 0.001$, obtain the optimal design result of the considered reliability constraint and manufacturing constraint and stop iterating. Otherwise, go back to step 101.

The second-order reliability analysis method comprises Breitung method, Tvedt method and the generalized Chi-square distribution-based second-order reliability method.

As for the existing variable stiffness composite plate and shell structures, because the FEM-based modeling analysis has inaccurate modeling, low efficiency and can't provide high-order sensitivity, and the traditional reliability optimization method has low efficiency and poor accuracy, the present invention comprehensively utilizes an accurate isogeometric modeling and analysis method, the first-order reliability method, the second-order reliability method and approximation function method, to introduce different analysis models in different optimization stages. Since the approximation function method and the first-order reliability method have high efficiency, and the accurate isogeometric modeling and analysis method not merely eliminates the gap between design model and calculation model, but also provides high-accuracy structural response and fully analytical sensitivity, the first-order reliability method based on the accurate isogeometric modeling and analysis is applied in the first stage of the reliability-based design optimization. The approximate most probable point $U_{AMPP}$ can be obtained by two-point adaptive nonlinear approximation function which is constructed on the basis of real structural response and sensitivity provided by the accurate isogeometric modeling and analysis method. The response value at $U_{AMPP}$ is verified by the isogeometric analysis, thereby significantly improving reliability optimization efficiency of the variable stiffness composite plate and shell structures and reducing the computational costs. If the constraint functional value at $U_{AMPP}$ is close enough to the constraint function, the second-order reliability is used in the second stage. To guarantee the accuracy of reliability analysis, the more accurate structural failure probability can be calculated by the fully analytical first-order and second-order derivatives of the isogeometric analysis method in the optimization of the second stage, which does not need much computational cost. The present invention is expected to be one of the main reliability optimization methods of variable stiffness composite plate and shell structures for China's launch vehicle in the aerospace field.

The present invention not only provides seamless integration of modeling, analysis and reliability-based design optimization of variable stiffness composite plate and shells structures, but also significantly improves efficiency and accuracy of reliability optimization and greatly shortens development cycle.

BRIEF DESCRIPTION OF THE FIGURES

FIG. 1 is a flow chart of optimization process of an integration method for accurate modeling and analysis and reliability-based design optimization of the variable stiffness composite plate and shell structures provided in the embodiments of the present invention.

FIG. 2 is a schematic diagram of a fiber placement path of the variable stiffness composite plate and shell structures.

DETAILED DESCRIPTION

Figure 3:
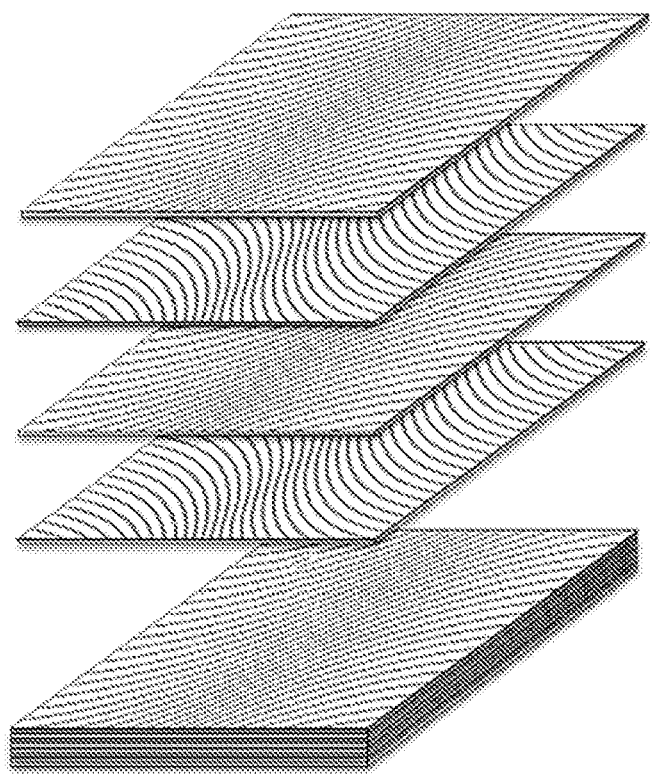
FIG. 3 is a schematic diagram of the layers of the variable stiffness composite plate and shell structures provided in the embodiments of the present invention.

To make the solved technical problems, the adopted technical solution and the achieved technical effect of the present invention more clear, the present invention will be further described below in detail in combination with the drawings. It should be understood that specific embodiments described herein are only used for explaining the present invention, not used for limiting the present invention. In addition, it should be noted that, for ease of description, the drawings only show some portions related to the present invention rather than all portions.

FIG. 1 is a flow chart of optimization process of an integration method for accurate modeling and analysis and reliability-based design optimization of variable stiffness composite plate and shell structures provided in the embodiments of the present invention.

As shown in FIG. 1, an integration method for accurate modeling and analysis and reliability-based design optimization of variable stiffness composite plate and shell structures provided in the embodiments of the invention, comprising:

Step 100: optimization of variable stiffness composite plate and shell structures by an efficient gradient-based algorithm, using the following sub steps:

Step 101:

obtaining the buckling load, mass, fully analytical first-order derivative and second-order derivative of the variable stiffness composite plate and shell structures by an accurate isogeometric modeling and analysis method;

calculating the manufacturing constraint and reliability constraint at current design point, transforming the deterministic buckling load constraint P≥P$^t$ to reliability constraint $p_f(P<P^t) \leq p^t_f$ based on reliability analysis method, for the variable stiffness composite plate and shell structures, where P is the structural buckling load; P$^t$ is the preset buckling load; $p_f$ the failure probability of P<P$^t$ is represented as $p_f(P<P^t)$; and $p^t_f$ is the preset failure probability.

The accurate isogeometric modeling and analysis method includes: describing fiber placement path by B-spline and parameterizing the fiber path by the control points; and obtaining the buckling load factor λ and buckling mode a$^i$ through the control equation of buckling analysis (K−λK$_G$) a$^i$=0 according to the obtained parameterized model. In this equation, K is the global stiffness matrix; and K$_G$ is the geometric stiffness matrix. In accordance with control equation of buckling analysis, the fully analytical first-order derivative and second-order derivative of design variables and random variables on the buckling load of the variable stiffness composite plate and shell structures are derived.

The maximum curvature of fiber placement path in the variable stiffness composite plate and shell structures which is less than target value is set as manufacturing constraint considered in the present invention. The placement forms of the linear gradient function are taken as example, and the fiber placement forms can be obtained by translating the given fiber placement path along they axis, which is shown in FIG. 2.

$$\theta(x') = \alpha + (T_1 - T_0)\frac{|x'|}{h} + T_0$$

where θ(x') is the fiber orientation angle at any position in the variable stiffness composite plate and shell structures. α is the included angle between reference coordinate axis x' and x of curvilinear fiber placement. $T_0$ is the included angle between the curvilinear fiber placement at ($x_0$, $y_0$) and coordinate axis x'. $T_1$ is the included angle between the distance h of curvilinear fiber placement from the original point of reference coordinate axis ($x_0$, $y_0$) and the coordinate axis x'. The representation of a single curvilinear angle is specified as α<$T_0$,$T_1$>. The curvature of fiber placement path in the variable stiffness composite plate and shell structures can be expressed as follows.

$$cur(x, y) = \frac{|y''|}{|1 + y'^2|^{\frac{3}{2}}}$$

$$FIB(x, y) = fib(x, y) - fib(x_0, y_0) = 0$$

$$y' = -\frac{FIB_x(x, y)}{FIB_y(x, y)}$$

where cur(x, y) is the curvature at (x, y); FIB(x, y) is the contour of fiber placement path field function; and fib(x, y) is the fiber placement path field function. The subscripts x, y represent the partial derivatives with respect to x and y. y' is a custom parameter, which represents an opposite number of the contour of fiber placement path field function at (x, y) with respect to the ratio of the partial derivative of x, y. y" is the derivative of x with respect to y'.

The failure probability can be obtained by reliability analysis, and for each optimization iteration, the reliability analysis is nested in the inner loop. The target failure probability can be selected based on the actual service safety requirements of the structures. Considering the high reliability requirements of aerospace structures, the general failure probability is selected as, $p_f$=0.001, the reliability is 1.0 subtract the failure probability, or the reliability plus the failure probability is 1.0. In the field of reliability optimization of the variable stiffness composite plate and shell structures, the fiber orientation angle and material property are the main influence factors of axial compression bearing capacity of the variable stiffness composite plate and shell structures. Usually, the reliability of the variable stiffness composite plate and shell structures is evaluated by evaluating the axial compression bearing capacity of the variable stiffness composite plate and shell structures. In this present invention, the reliability constraint is the reliability of buckling load under axial compression of the variable stiffness composite plate and shell structures (e.g., the probability of buckling load under axial compression which is more than a certain value).

Step 102:

establishing an integrated design framework for the accurate modeling and analysis and reliability-based design optimization of the variable stiffness composite plate and shell structures;

considering the uncertainty factors;

setting as design variable one of the three following variables such as single-layer fiber orientation angle, layer thickness and layer number or the combination of these three variables;

setting deviation of material property and deviation of fiber orientation angle as random variables;

optimizing the structural weight and/or manufacturing costs of the structure using the efficient gradient-based algorithm based on the manufacturing constraint and reliability constraint of the bucking load.

Specifically, the optimizing formulation provided in the embodiments of the invention can be expressed as:

Design variable: $d=[\alpha, T_0, T_1, t, n]$
Random variable: $X=[T_0, T_1, E_1, E_2, G_{12}, G_{13}, G_{23}, \upsilon_n]$
Objective function: W
Constraint function: $p_f(P<P^t) \leq p^t_f$
cur $(x, y) \leq c_m$ where d is the design variable; a is the entire rotation angle of the fiber field; $T_0$ and $T_1$ respectively represent the fiber orientation angle; t is the single layer thickness; n is number of layers; X is the random variable; $E_1$, $E_2$, $G_{12}$, $G_{23}$, $G_{23}$ are elastic constants; $\upsilon_{12}$ is Poisson ratio; W is structural weight; P is the structural buckling load or crushing load; $P^t$ is the target structural buckling load; $p_f$ is the failure probability; $p^t_f$ is target failure probability; cur(x,y) is the curvature at (x, y); and $c_m$ is the maximum curvature allowed for manufacturing constrain.

The uncertainty factors include: deviation of material property, the deviation of fiber orientation angle, etc. Specifically, the deviation of material property can be statistically obtained from tensile test. The deviation of fiber orientation angle can be measured by the protractor and statistically obtained. For the uncertainty factors, the random distribution types of the uncertainty factors such as normal distribution, lognormal distribution, uniform distribution, Weibull distribution, etc., can be given on the basis of statistical data, and the uncertainty factors of different distribution types exert different impacts on the constraint and objective.

FIG. 3 is a schematic diagram of the layers of the variable stiffness composite plate and shell structures provided in the embodiments of the present invention. The reliability-based design optimization can be conducted on curved variable stiffness composite plate and shell structures, stiffened plate and shell structures, plate and shell structures with cutouts and other composite plate and shell structures by using the method provided in the present invention.

Step 200: reliability analysis of the variable stiffness composite plate and shell structures by the first-order reliability method, using the following sub steps:

Step 201:

initializing the inner iterative step number k=0 and transform the random variables in step 102 to standard normal variables in standard Gaussian space (U-space); and calculating the structural buckling load P and fully analytical sensitivity at kth iterative point $U_k$ in U-space based on the accurate isogeometric modeling and analysis method.

The method of transforming the random variables into standard Gaussian space means that when the random variables are normal distribution, the random variables can be directly transformed into standard Gaussian space based on their mean value and standard deviation. Otherwise, an equivalent normal distribution method is used.

Step 202: solving the next iterative point $U_{k+1}$ by the enhance chaos control (ECC) method of the first-order reliability method; and calculating the structural buckling load P and fully analytical sensitivity at $U_{k+1}$ based on the accurate isogeometric modeling and analysis method.

The first-order reliability method means a method which uses the first-order Taylor series expansion of constraint function g (U) at U* to approximate the complex real constraint function as $$\tilde{g}(U) \approx g(U^*) + \sum_{i=1}^{n} \nabla_{u_i} g(U^*)(u_i - u_i^*).$$

In this method, all random variables are transformed into standard Gaussian space. The distance between origin point and $U^*_{characterizes}$ the reliability analysis method of the reliability index β. β corresponds to the quantile of the probability density function φ of standard normal variables, i.e., safety probability $P_s=\Phi(\beta)=1-P_f$, where Φ is the cumulative distribution function of standard normal variables. The reliability index β can be calculated by the following formula.

$$\beta = \frac{g(U^*) - \sum_{i=1}^{n} \nabla_{u_i} g(U^*)\sigma_{x_i} u_i^*}{\sqrt{\sum_{i=1}^{n} (\nabla g(U^*)\sigma_{x_i})^2}}$$

where U* is the most probable point; $u^*_i$ is the ith element of U*; ∇g(U*) is the derivative of constraint function at U*; and $\sigma_{x_i}$ is the standard deviation of random variable $x_i$. The solving method of most probable point includes an advanced mean value (AMV) method, a stable transform method (STM), an enhanced chaos control (ECC) method and an efficient adaptive-loop (EAL) method. The formula of the robust and efficient ECC is shown as follows:

$$U_{k+1} = \beta \frac{\tilde{n}(U_{k+1})}{\|\tilde{n}(U_{k+1})\|}$$

$$\tilde{n}(U_{k+1}) = U_k + \gamma_k C(F(U_k) - U_k) \quad 0 < \gamma < 1$$

$$F(U_k) = \frac{G_{k,u}^T U^{(k)} - g(U_k)}{G_{k,u}^T G_{k,u}} G_{k,u}$$

$$\gamma_k \begin{cases} \frac{\omega_k}{\omega_{k+1}} \gamma_{k-1} & \text{if } \omega_{k+1} > \omega_k \text{ and } \varphi_{k+1} \geq 90° \\ \gamma_{k-1} & \text{else} \end{cases}$$

$$\omega_k = \arccos\left(\frac{G_{k-1,u}^T G_{k,u}}{\sqrt{G_{k-1,u}^T G_{k-1,u}} \sqrt{G_{k,u}^T G_{k,u}}}\right)$$

$$G_{k,u} = \left\{\frac{\partial g}{\partial u_1}, \frac{\partial g}{\partial u_2}, \dots, \frac{\partial g}{\partial u_n}\right\}^T$$

-continued $$\gamma_k = \begin{cases} 0.9\gamma_k & \begin{array}{l} f(U_k + \gamma_k(F(U_k) - U_k)) > \\ f(U_k) + \gamma_k \rho \nabla f(U_k)^T (F(U_k) - U_k) \ 0 < \rho < 1 \end{array} \\ 1.1\gamma_k & \begin{array}{l} \nabla f(U_k + \gamma_k(F(U_k) - U_k))^T (F(U_k) - U_k) < \\ \varsigma \nabla f(U_k)^T (F(U_k) - U_k) \ \rho < \varsigma < 1 \end{array} \\ \gamma_k & \text{else} \end{cases}$$

$$f(U_k) = \frac{1}{2} U_k^T U_k + c \cdot g(U_k)^2 \ \rho = 0.2, \varsigma = 0.8$$

where $\overset{\rightarrow}{n}(U_{k+1})$ is the direction vector of $U_{k+1}$; $G_k$, is the derivative of g (U) at $U_k$; f( ) is merit function; $\nabla f()$ is the derivative of merit function with respect to U; $F(U_k)$ is a transition variable; c is a coefficient of merit function; $\rho$, $\varsigma$ are constants; C is an involutory matrix; $\gamma$ is the control factor; $\omega_k$ is the included angle between $U_{k-1}$ and $U_k$; $\varphi_{k+1}$ is the included angle between $(F(U_k)-U_k)$ and $(U_k-U_{k-1})$; arccos( ) is the arc-cosine function; and Superscript T represents the matrix transposition.

Step 203:

constructing two-point adaptive nonlinear approximation function by the provided structural buckling load and analytical sensitivity at $U_k$ and $U_{k-1}$; and solving the approximate most probable point $U_{AMPP}$ by the ECC and determine whether it satisfies the convergence condition or not.

If satisfied, calculate the real sensitivity at $U_{AMPP}$. Otherwise, set k=k+1 and go back to step 202. Wherein:

The convergence condition described is the euclidean norm of the different value between $U_{k+1}$ and $U_{AMPP}$, i.e., $|U_{k+1}-U_{AMPP}|\leq 0.001$.

The TANA function establishes a local approximate function of the constraint function by fitting the function value and gradient value at two points. The form of TANA function $\overset{\smile}{g}(X)$ constructed by the TANA method is shown as follows:

$$\overset{\smile}{g}(X) = g(X_k) + \frac{1}{r} \sum_{i=1}^{n} x_{i,k}^{1-r} \frac{\partial g(X_k)}{\partial x_i} (x_i^r - x_{i,k}^r)$$

where $x_{i,k}$ is the ith element of the design variable $X_k$ at kth iteration. The nonlinear index r can be obtained from the following formula:

$$g(X_{k-1}) = \left\{ g(X_k) + \frac{1}{r} \sum_{i=1}^{n} x_{i,k}^{1-r} \frac{\partial g(X_k)}{\partial x_i} (x_i^r - x_{i,k}^r) \right\} = 0$$

Step 204:

calculating the constraint function value $g(U_{AMPP})$ at $U_{AMPP}$ based on the accurate isogeometric modeling and analysis method and determining whether it is close enough to the constraint or not.

If yes, go to step 203 to conduct the second-order reliability analysis. Otherwise, go back to step 101. Wherein:

The condition that is close enough to the constraint is defined as $$\Delta g = \frac{|g(U_{AMPP})|}{|B(X_{initial})|} \leq 0.001,$$

where B ($X_{initial}$) is the buckling load of the structures at initial design point $X_{initial}$.

Step 300: second-order reliability analysis by first-order reliability information including $U_{AMPP}$ and the constraint value at $U_{AMPP}$ in step 204, using the following sub steps:

Step 301: solving the structural real sensitivity and second-order derivative at $U_{AMPP}$ based on the accurate isogeometric modeling and analysis method.

Step 302:

conducting reliability analysis on the variable stiffness composite plate and shell structures by the second-order reliability method and solve the failure probability $p_f$.

If $|p_f - p'_f| \leq 0.001$, obtaining the optimal design of the considered reliability constraint and manufacturing constraint and halt iteration. Otherwise, go back to step 101. The second-order reliability method comprises Breitung method, Tvedt method and the generalized Chi-square distribution-based second-order reliability method.

The second-order reliability method means a method which uses the second-order Taylor series expansion of constraint function g (U) at U* to approximate the complex real constraint function as $$\tilde{g}(U) \approx g(U^*) + \frac{1}{2} \nabla g(U^*)^T (U - U^*) + (U - U^*)^T \nabla^2 g(U^*)(U - U^*).$$

Based on the second-order expansion, the more accurate failure probability at current design point is solved. The second order reliability method (SORM) includes a Breitung method, a Tvedt method and a generalized Chi-square distribution-based second-order reliability method. The formula of the failure probability at the current design point by the Tvedt method is shown as follows:

$$P_f = A_1 + A_2 + A_3$$

$$A_1 = \Phi(-\beta) \prod_{i=1}^{n-1} (1 + k_i \beta)^{-\frac{1}{2}}$$

$$A_2 = [\beta \Phi(-\beta) - \phi(\beta)] \left\{ \prod_{i=1}^{n-1} (1 + k_i \beta)^{-\frac{1}{2}} - \prod_{i=1}^{n-1} (1 + k_i(1 + \beta))^{-\frac{1}{2}} \right\}$$

$$A_3 = (1 + \beta)[\beta \Phi(-\beta) - \phi(\beta)] \left\{ \left\{ \prod_{i=1}^{n-1} (1 + k_i \beta)^{-\frac{1}{2}} \right\} - \text{Re} \left\{ \prod_{i=1}^{n-1} (1 + k_i(i + \beta))^{-\frac{1}{2}} \right\} \right\}$$

where $A_1$, $A_2$ and $A_3$ are three items of the failure probability $P_f$; $\Phi( )$ is the cumulative distribution function of standard norm distribution; $\phi( )$ is the probability density function of standard norm distribution; and $k_i$ is the principal curvatures of failure surface probability at U*.

Figure 4:
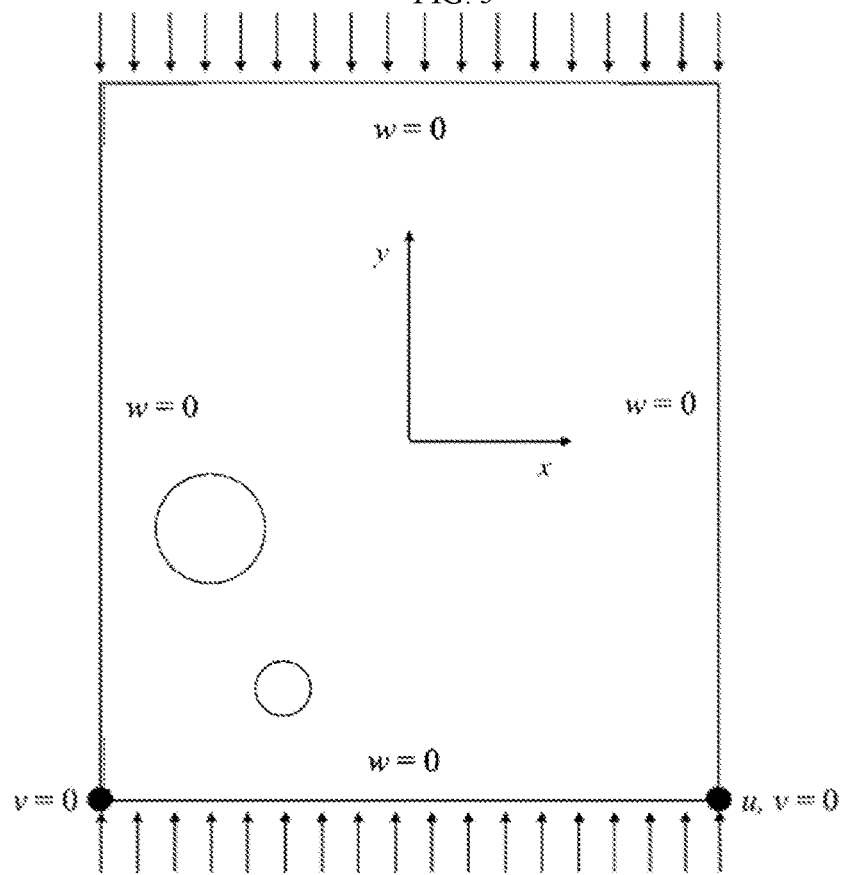
FIG. 4 is a structure diagram of the variable stiffness composite plate and shell structures provided in the embodiments of the present invention.

FIG. 4 is a diagram of the variable stiffness composite plate structure. A carbon fiber/epoxy AS4/9773 resin matrix composite plate with a geometric dimension of 609.6 mm×711.2 mm is considered as shown in FIG. 4. The initial number of layers is 12 and the thickness of single layer is 0.1905 mm. The initial design placement information refers to $\{25<20,16>,-25<-20,-16>,-12<40,70>,12<-40,-70>,-12<40,70>,12<-40,-70>\}_s$, where the subscript s means the placement form is symmetric. Structural weight and buckling load are 1.6 kg and 4.26 kN respectively. The target buckling load is 3.0 kN. The target failure probability is $p'_f$=99.87%. The elastic constants and Poisson ratio are considered as normal random variables, and the variation coefficient is 0.03. Fiber orientation angles $T_0$ and $T_1$ are considered as normal distribution random variables, and the standard deviation is 0.05.

Figure 5:
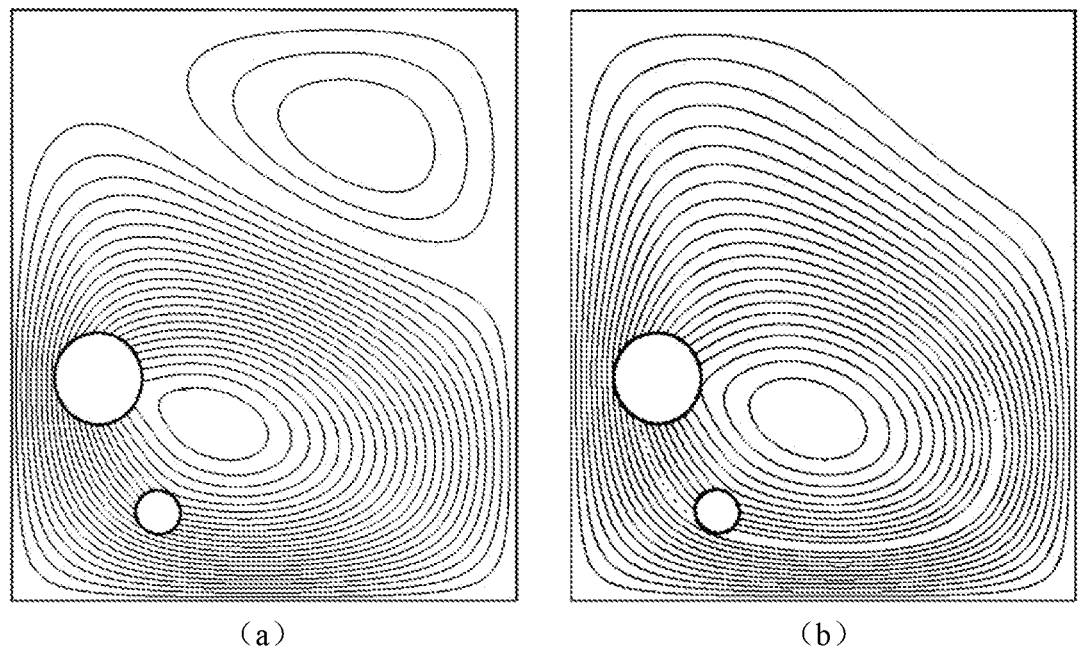
FIG. 5 is a buckling mode diagram of initial design and optimal design of the variable stiffness composite plate and shell structures provided in the embodiments of the present invention. (a) is the buckling mode diagram of initial design; (b) is the buckling mode diagram of optimal design.
Figure 6:
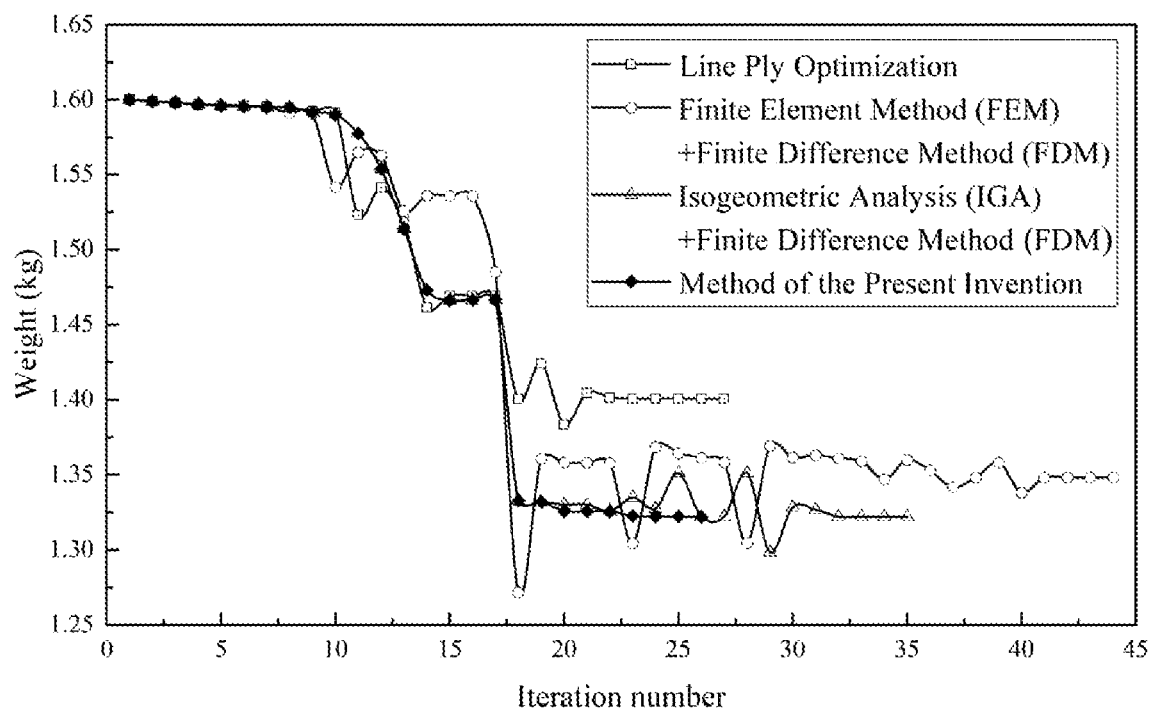
FIG. 6 is an optimized iterative curve of the variable stiffness composite plate and shell structures provided in the embodiments of the present invention.

The optimized iterative curve is shown in FIG. 6. Compared with the finite difference method-based finite element method and isogeometric analysis method, the proposed integration method for accurate modeling and analysis and reliability-based design optimization of variable stiffness composite plate and shell structures provided in the present invention can converge to the optimal solution rapidly and the iterative process is smoother. Furthermore, the more accurate failure probability can be obtained based on the reliability optimization of the second-order reliability method. In terms of the efficiency of the single analysis, the number of the isogeometric analysis invoked based on the proposed method of the present invention is the least, and it is only 1/5 of the optimization strategy of the conventional first-order reliability method. The proposed method of the present invention can reduce the structural mass by 17.5% without losing calculation accuracy of failure probability. The finite difference method-based finite element method (FEM+FDM), by contrast, merely reduces the structural mass by 15.6% and the calculation accuracy of failure probability cannot be ensured. The buckling mode diagram of initial design and optimal design is shown in FIG. 5. Compared with the a traditional reliability optimization method based on the finite element analysis method and finite difference method, the proposed integration method for accurate modeling and analysis and reliability-based design optimization of variable stiffness composite plate and shell structures of the present invention can be significantly improved in computational efficiency and accuracy, which saves much time for the design, research and development of variable stiffness composite plate and shell structures in the future, and significantly increases the load-carrying efficiency of the optimized structures. The invention is expected to be one of the main reliability optimization methods of variable stiffness composite plate and shell structures for China's launch vehicle design in the aerospace field.

An integration method for accurate modeling and analysis and reliability-based design optimization of variable stiffness composite plate and shell structures is provided in the present invention. As for the existing variable stiffness composite plate and shell structures, because the FEM-based modeling analysis has inaccurate modeling, low solution efficiency and can't provide high-order sensitivity, and the traditional reliability optimization method has low efficiency and poor accuracy, the present invention comprehensively utilizes the accurate isogeometric modeling and analysis method, the first-order reliability method, the second-order reliability method and approximation function method, to introduce different analysis models in different optimization stages. Since the approximation function method and the first-order reliability method have high efficiency calculations, and the accurate isogeometric modeling and analysis method not merely eliminates the gap between design model and calculation model, but also provides high-accuracy structural response and fully analytical sensitivity, the first-order reliability method based on the accurate isogeometric modeling and analysis is applied in the first stage of the reliability-based design optimization. The approximate most probable point can be obtained by two-point adaptive nonlinear approximation function which is constructed on the basis of real structural response and sensitivity provided by the accurate isogeometric modeling and analysis method. The response value at the approximate most probable point is verified by the isogeometric analysis, thereby significantly improving reliability optimization efficiency of the variable stiffness composite plate and shell structures and reducing the computational costs. If the point is close enough to the constraint function, the second-order reliability is solved in second stage. To guarantee the accuracy of reliability analysis, the more accurate structural failure probability can be calculated by the fully analytical first-order and second-order derivatives of the isogeometric method in the optimization of the second stage, which does not need much computation cost. The present invention is expected to be one of the main reliability optimization methods of variable stiffness composite plate and shell structures for China's launch vehicle in the aerospace field.

Finally, it should be noted that the above various embodiments are only used for describing the technical solution of the present invention rather than limiting the present invention. Although the present invention is already described in detail through the above various embodiments, those ordinary skilled in the art shall understand: the technical solution recorded in each of the embodiments can be still amended, or some or all technical features therein can be replaced equivalently without enabling the essence of the corresponding technical solution to depart from the scope of the technical solution of various embodiments of the present invention.

The invention claimed is:

1. An integration method for accurate modeling and analysis and reliability-based design optimization of variable stiffness composite plate and shell structures, comprising:

Step 100: performing a design optimization of variable stiffness composite plate and shell structures by an efficient gradient-based algorithm, using the following sub steps:

Step 101:

obtaining structural buckling load, mass, fully analytical first-order derivative and second-order derivative of the structural buckling load of the variable stiffness composite plate and shell structures by an accurate isogeometric modeling and analysis method;

calculating the manufacturing constraint and reliability constraint at current design point; and transforming a deterministic buckling load constraint $P \geq P^t$ to the reliability constraint $p_f(P<P^t) \leq p^t_f$ based on a reliability analysis method, for the variable stiffness composite plate and shell structures where P is the structural buckling load;

$P^t$ is the target structural buckling load;

$p_f$ is the failure probability of $P<P^t$; and $p^t_f$ is the target failure probability;

Step 102:

establishing an integrated design framework for the accurate modeling and analysis and reliability-based design optimization of the variable stiffness composite plate and shell structures;

considering the uncertainty factors;

setting as design variable one of the three following variables such as single-layer fiber orientation angle, layer thickness and layer number or any combination of these three variables;

setting deviation of material property and deviation of fiber orientation angle as random variables;

optimizing the structural weight and/or manufacturing costs of the structure using the efficient gradient-based algorithm based on the manufacturing constraint and reliability constraint of the bucking load;

Step 200: performing a first-order reliability analysis of the variable stiffness composite plate and shell structures by a first-order reliability method, using the following sub steps:

Step 201:
initializing the inner iterative step number k=0;
transforming the random variables in step 102 to standard normal variables in standard Gaussian space (U-space); and
calculating the structural buckling load, P and fully analytical sensitivity of the buckling load at kth iterative calculating point, $U_k$ in U-space based on the accurate isogeometric modeling and analysis method;

Step 202:
solving for the structural buckling load, P at the next iterative point, $U_{k+1}$ by the enhanced chaos control (ECC) method of the first-order reliability method; and
calculating the structural buckling load P and fully analytical sensitivity of the buckling load at iterative point $U_{k+1}$ based on the accurate isogeometric modeling and analysis method;

Step 203:
constructing the two-point adaptive nonlinear approximation function using the calculated structural buckling load and fully analytical sensitivity at $U_k$ and $U_{k+1}$; and
solving for the structural buckling load, P at the approximate most probable point ($U_{AMPP}$) by ECC;
determining whether it satisfies a convergence condition or not;
if satisfied, calculating the real sensitivity at $U_{AMPP}$;
otherwise, setting k=k+1 and going back to step 202;
wherein:
the two-point adaptive nonlinear approximation function is constructed by one of two-point adaptive nonlinear approximation method (TANA) and its variants known as TANA1 and TANA2 and
the convergence condition described in this step is the Euclidean norm of the different difference value between
$U_{k+1}$ and $U_{AMPP}$, i.e., $|U_{k+1}-U_{AMPP}|\leq 0.001$;

Step 204:
calculating the constraint function value $g(U_{AMPP})$ at $U_{AMPP}$ based on the accurate isogeometric modeling and analysis method;
determining whether it is close enough to the constraint or not;
if yes, going to step 203 to conduct the second-order reliability analysis;
otherwise, going back to step 101,
wherein:
the condition that is close enough to the constraint is defined as $$\Delta g = \frac{|g(U_{AMPP})|}{|B(X_{initial})|} \leq 0.001,$$

where $B(X_{initial})$ is the structural buckling load at initial design point $X_{initial}$;

Step 300: performing a second-order reliability analysis using first-order reliability information including $U_{AMPP}$ and the constraint function value at $U_{AMPP}$ in step 204, using the following sub steps:

Step 301: solving for the structural real sensitivity and second-order derivative at U based on the accurate isogeometric modeling and analysis method;

Step 302:
conducting the second-order reliability analysis on the variable stiffness composite plate and shell structures by the second-order reliability analysis method; and
solving for the failure probability $p_f$;
if $|p_f - p^r_f| \leq 0.001$, obtaining the optimal design result of the considered reliability constraint and manufacturing constraint and stopping iterating; and
otherwise, going back to step 101.

2. The integration method for accurate modeling and analysis and reliability-based design optimization of variable stiffness composite plate and shell structures according to claim 1, wherein the efficient gradient-based algorithm in step 102 consists of an interior point method, an active-set method, a method of moving asymptotes, a Broyden-Fletcher-Goldfarb-Shanno (BFGS) algorithm and a sequential approximate programming method.

3. The integration method for accurate modeling and analysis and reliability-based design optimization of variable stiffness composite plate and shell structures according to claim 1, wherein a formula of the enhance chaos control (ECC) method in step 202 is as follows:

$$U_{k+1} = \beta \frac{\widetilde{n}(U_{k+1})}{\|\widetilde{n}(U_{k+1})\|}$$

$$\widetilde{n}(U_{k+1}) = U_k + \gamma_k C(F(U_k) - U_k) \quad 0 < \gamma < 1$$

$$F(U_k) = \frac{G_{k,u}^T U^{(k)} - g(U_k)}{G_{k,u}^T G_{k,u}} G_{k,u}$$

$$\gamma_k \begin{cases} \frac{\omega_k}{\omega_{k+1}} \gamma_{k-1} & \text{if } \omega_{k+1} > \omega_k \text{ and } \varphi_{k+1} \geq 90° \\ \gamma_{k-1} & \text{else} \end{cases}$$

$$\omega_k = \arccos\left(\frac{G_{k-1,u}^T G_{k,u}}{\sqrt{G_{k-1,u}^T G_{k-1,u}} \sqrt{G_{k,u}^T G_{k,u}}}\right)$$

$$G_{k,u} = \left\{\frac{\partial g}{\partial u_1}, \frac{\partial g}{\partial u_2}, \ldots, \frac{\partial g}{\partial u_n}\right\}^T$$

$$\gamma_k = \begin{cases} 0.9\gamma_k & \begin{aligned} & f(U_k + \gamma_k(F(U_k) - U_k)) > \\ & f(U_k) + \gamma_k \rho \nabla f(U_k)^T (F(U_k) - U_k) \; 0 < \rho < 1 \end{aligned} \\ 1.1\gamma_k & \begin{aligned} & \nabla f(U_k + \gamma_k(F(U_k) - U_k))^T(F(U_k) - U_k) < \\ & \varsigma \nabla f(U_k)^T (F(U_k) - U_k) \; \rho < \varsigma < 1 \end{aligned} \\ \gamma_k & \text{else} \end{cases}$$

$$f(U_k) = \frac{1}{2} U_k^T U_k + c \cdot g(U_k)^2 \quad \rho = 0.2, \varsigma = 0.8$$

where $\widetilde{n}(U_{k+1})$ is the direction vector of $U_{k+1}$; $G_{k,u}$ is the derivative of g(U) at $U_k$; f( ) is merit function; $\nabla f()$ is the derivative of merit function with respect to U; $F(U_k)$ is a transition variable; c is a coefficient of merit function; $\rho$, $\zeta$ are constants; C is an involutory matrix; $\gamma$ is the control factor; $\omega_k$ is the included angle between $U_{k-1}$ and $U_k$; $\omega_{k+1}$ is the included angle between $(F(U_k)-U_k)$ and $(U_k-U_{k-1})$; arc cos( ) is the arc-cosine function; and Superscript T represents the matrix transposition.

4. The integration method for accurate modeling and analysis and reliability-based design optimization of variable stiffness composite plate and shell structures according to claim 1, wherein the second-order reliability method in step 302 comprises a Breitung method, a Tvedt method and a generalized Chi-square distribution-based second-order reliability method.

* * * * *